United States Patent [19]

Carr

[11] 4,314,348
[45] Feb. 2, 1982

[54] SIGNAL PROCESSING WITH RANDOM ADDRESS DATA ARRAY AND CHARGE INJECTION OUTPUT

[75] Inventor: William N. Carr, Dallas, Tex.

[73] Assignee: Recognition Equipment Incorporated, Irving, Tex.

[21] Appl. No.: 45,797

[22] Filed: Jun. 5, 1979

[51] Int. Cl.³ .................... G06J 1/00; G06F 15/336; G06F 15/347
[52] U.S. Cl. .................... 364/604; 364/581; 364/728; 364/862
[58] Field of Search ............... 364/604, 606, 728, 824, 364/772, 862, 864, 581

[56] References Cited

U.S. PATENT DOCUMENTS

| | | | |
|---|---|---|---|
| 3,036,775 | 5/1962 | McDermid et al. | 364/728 |
| 3,426,185 | 2/1969 | Cox et al. | 364/772 |
| 3,449,553 | 6/1969 | Swan | 364/728 X |
| 3,670,151 | 6/1972 | Lindsay et al. | 364/728 |
| 3,717,756 | 2/1973 | Stitt | 364/728 |
| 3,725,689 | 4/1973 | Kautz | 364/728 |
| 3,732,410 | 5/1973 | MacKechnie | 364/728 X |
| 3,935,439 | 1/1976 | Buss et al. | 364/824 |
| 3,940,602 | 2/1976 | Lagnado et al. | 364/864 X |
| 4,032,885 | 6/1977 | Roth | 364/728 |
| 4,079,238 | 3/1978 | Lampe et al. | 364/824 |
| 4,156,284 | 5/1979 | Engeler | 364/862 |
| 4,161,783 | 7/1979 | Wrench, Jr. et al. | 364/606 |
| 4,218,752 | 8/1980 | Hewes et al. | 364/604 X |

FOREIGN PATENT DOCUMENTS 1473006  2/1967  France .............................. 364/728

OTHER PUBLICATIONS

Zimmerman et al: A New Role for Charge-coupled Devices: Digital Signal Processing, Electronics vol. 50, No. 7, Mar. 31, 1977, pp. 97-103 (102-103 of interest).

Primary Examiner—Felix D. Gruber
Attorney, Agent, or Firm—John E. Vandigriff

[57] ABSTRACT

The weighted product of two digital signals obtained with a digital weighted template with corresponding binary signal stored within a two-dimensional matrix. Data is loaded into a circuit in word serial and random access modes. The weighted signal product is obtained using a vertical charge injection technique with sensing of the substrate analog charge flow. The substrate charge collection output permits a true summation of processed analog signals to provide the desired weighted product.

12 Claims, 15 Drawing Figures

SIGNAL PROCESSING WITH RANDOM ADDRESS DATA ARRAY AND CHARGE INJECTION OUTPUT

FIELD OF THE INVENTION

This invention relates to integrated solid circuits and more particularly a circuit for performing signal processing using charge injection techniques and sensing the substrate analog charge flow to provide the desired correlation product.

BACKGROUND OF THE INVENTION

Linear transformations and filters for electronic signals are commonly employed in communications and signal processing systems. The signal processing time required for implementing these functions using standard computer hardware is often unacceptable. Special purpose hardware permits real-time processing.

A correlation circuit is described in U.S. Pat. No. 3,940,602. This processor is used in combination with an optical input and performs a linear transformation upon the signal input through the signals derived from the optical input.

Another system is described in U.S. Pat. No. 4,085,456 in which an optical sensing array and another storage array is used. The proposed application for the device described in this patent is used as a charge transfer image device.

The present invention uses an integrated circuit array with registers thereon, one set of which is programmable and permits real-time implementation of digital digital signals processing.

SUMMARY OF THE INVENTION

In the present invention, an integrated circuit containing three coupled array registers is used to perform digital signal processing. One register array is a two-dimensional matrix with the serial address data input wherein the data input consists of separate words input in a sequential maner. Another of the registers is a two-dimensional matrix wherein data is written into the array by either serial or random addressing. A controller for this array determines whether the data will be entered either sequentially in a serial word fashion or in random addressed words. Once the data is entered into the register, it may be shifted bidirectionally.

The third register consists of a separate stage for each intersection point within a matrix. The register contains digital input circuitry with coupling to both of the other two registers, and has an analog output. A linear convolution array similar in structure is defined in U.S. application Ser. No. 045,798 filed June 5, 1979.

BRIEF DESCRIPTION OF THE DRAWINGS

The features as represented by this invention further are described in the following detailed description and in the drawings in which:

FIG. 10 illustrates the control pulses for static holding in array register B;

Figure 1:
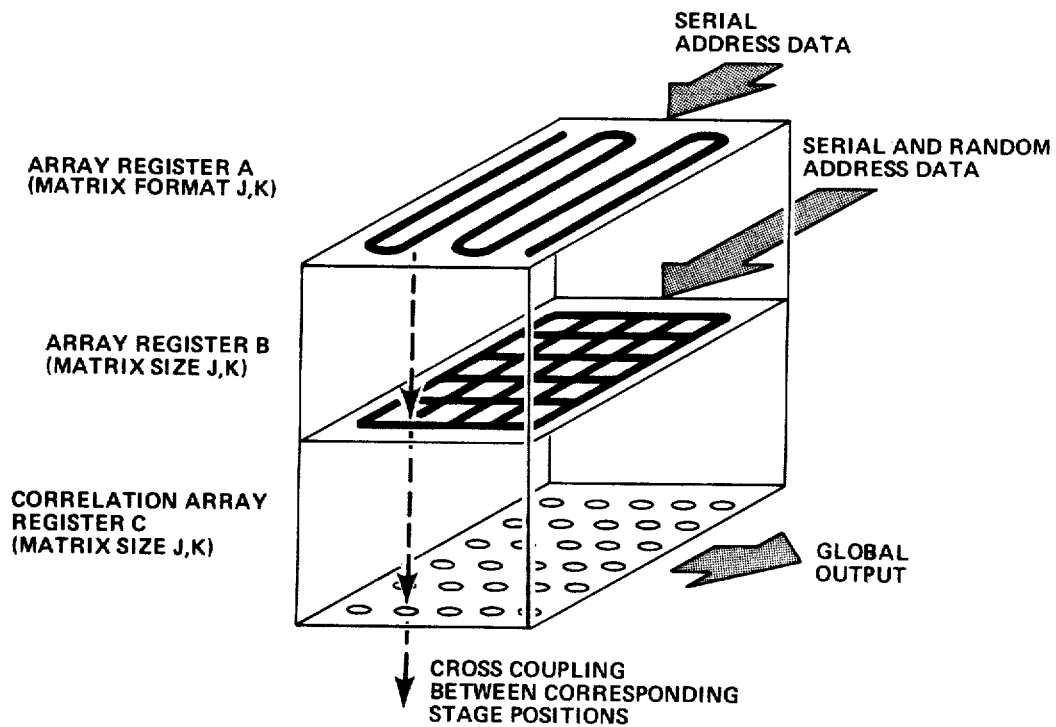
FIG. 1 is a generalized block diagram of an embodiment of the invention showing arrays A, B and C of the invention.

The processor circuit contains three coupled array registers A, B and C as shown in FIG. 1. Array register A consists of a two dimensional matrix with a serial address data input. The serpentine format of register A is dimensioned as J-rows and K-columns. Input data consists of separate words input in a sequential manner. Array register A consists of shift registers which are bidirectionally controlled.

Array register B shown in FIG. 1 contains another two dimensional matrix of J-rows and K-columns. Data is written into array register B by either a serial or random address scheme. A controller for array register B determines whether the data will be entered sequentially in a serial word fashion or with random addressed words. Array register B permits the data once entered to be shifted bidirectionally along columns under clocking control.

Array register C consists of a separate stage for each intersection point within a matrix of J-rows and K-columns. The array register C contains digital input circuitry with coupling to both registers A and B together with an analog global output.

The coupling between array registers A, B and C occur only within each stage. Each of the array registers consist of J-K separate stages. In FIG. 1 the vertical dotted line graphically illustrates the cross-coupling between corresponding stage positions of registers A, B, and C.

Figure 2:
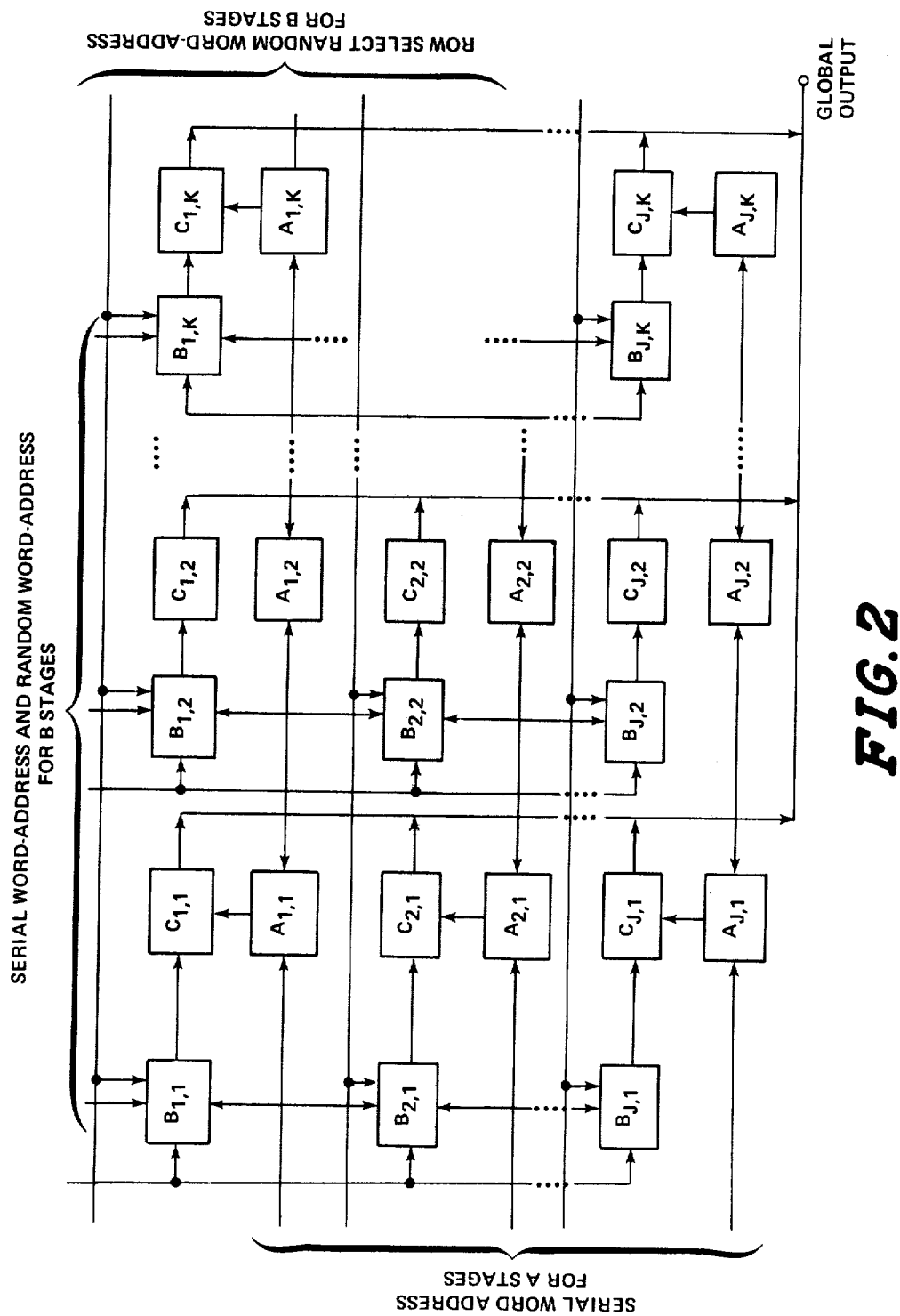
FIG. 2 is a single stage within a coupled array of the invention.

A further expanded view of array registers A, B and C is shown in FIG. 2. The array register A has serial word address control available along each separate row of the array. Data is shifted into array register A along rows across adjacent columns as shown in FIG. 2.

Array register B has data entering through the serial word address and random word address controller. The controller determines whether the data will be entered into array register B as serial word addressing along columns across adjacent rows or in a random word addressed scheme. Each stage consists of the array register A, B and C components as shown in FIG. 2. Each stage is cross-coupled within the two dimensional matrix of size J-rows and K-columns as shown. Data may be shifted along columns between adjacent row stages in the B register. Data in array register A stages may be shifted bidirectionally between stages of the A register along rows. Each stage of array register C is cross-coupled to the A and B stage components at each array position. Each stage of array register C has an analog transfer gate into the global output.

Figure 3:
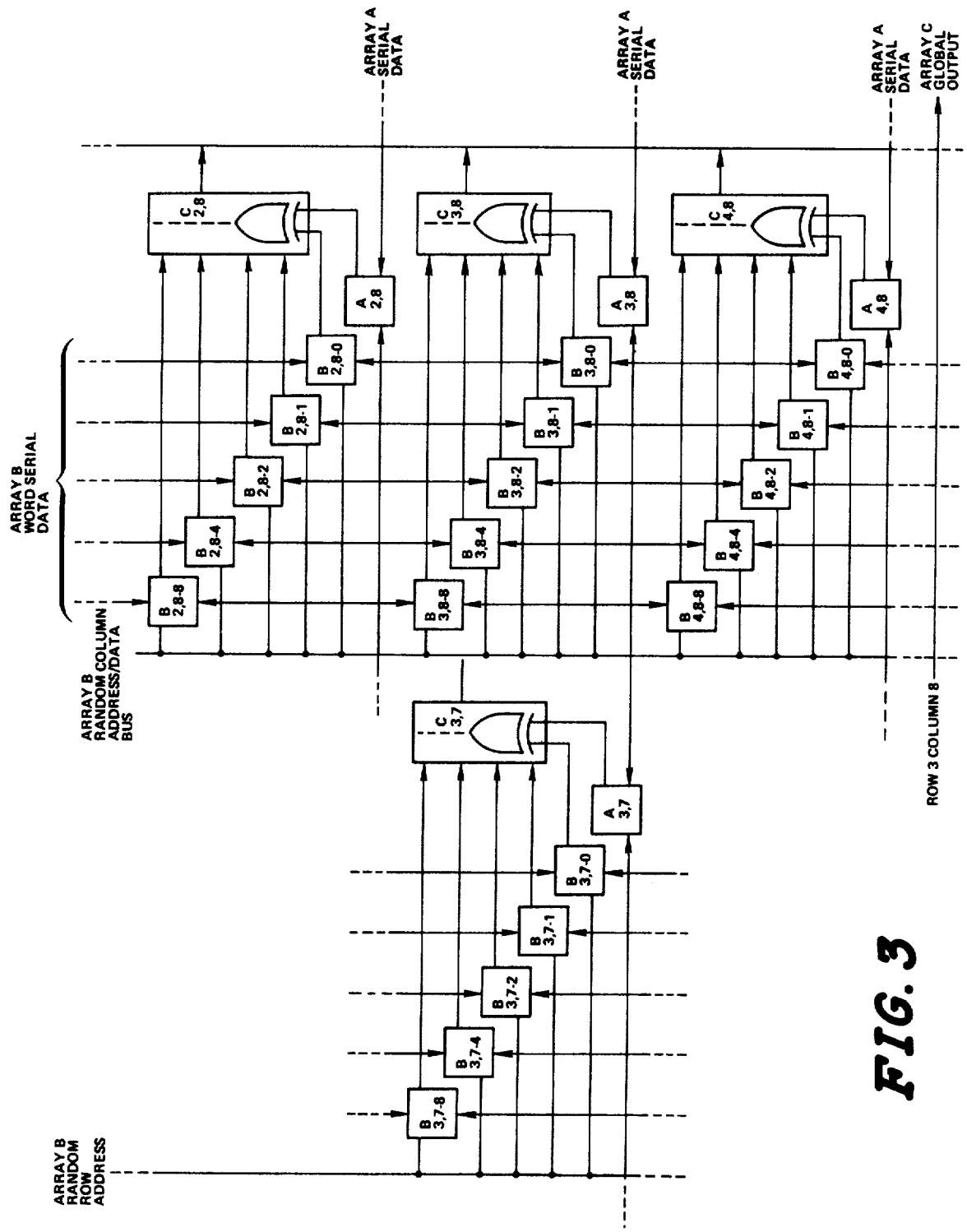
FIG. 3 is a diagram illustrating the interconnection of the digital arrays.

An individual stage at row 3 and column 8 is selected for further detailing in FIG. 3. Here surrounding stages of row 2 column 8, row 4 column 8, and row 3 column 7 are shown by way of example. The stage at row 3 column 8 contains an individual array register A shift register cell which contains a single bit of information. The stage of array register A is coupled to nearest neighbor stages in row 3, column 7 and row 3, column 9 positions (row 3, column 9 not shown in FIG. 3). Data can be shifted bidirectionally between array register A, row 3, column 8 and the two adjacent stages on that row.

The stage of array register B at row 3, column 8 consists of five separate bit cells as shown in FIG. 3. One of the bit positions of array register B is labeled 3, 8-0 to indicate that it is the match, mismatch bit used to determine the correlation quadrant. Separately at row 3, column 8 four additional bits in array register B are denoted as 3, 8-8; 3, 8-4; 3, 8-2; and 3, 8-1. These four bits determine the magnitude of the weighting factor used within said stage for the signal function. The data from the array register A stage and array register B zero bit within the stage at row 3, column 8 inputs to the Exclusive OR gate within array register C. Said array register C stage at row 3, column 8 determines whether or not the weight from the four weighting bits of array register B will be added into the global output.

The output from array register C is analog in nature. Array register C cannot be addressed directly from external controllers. The only output from array register C is the global output node.

Figure 4:
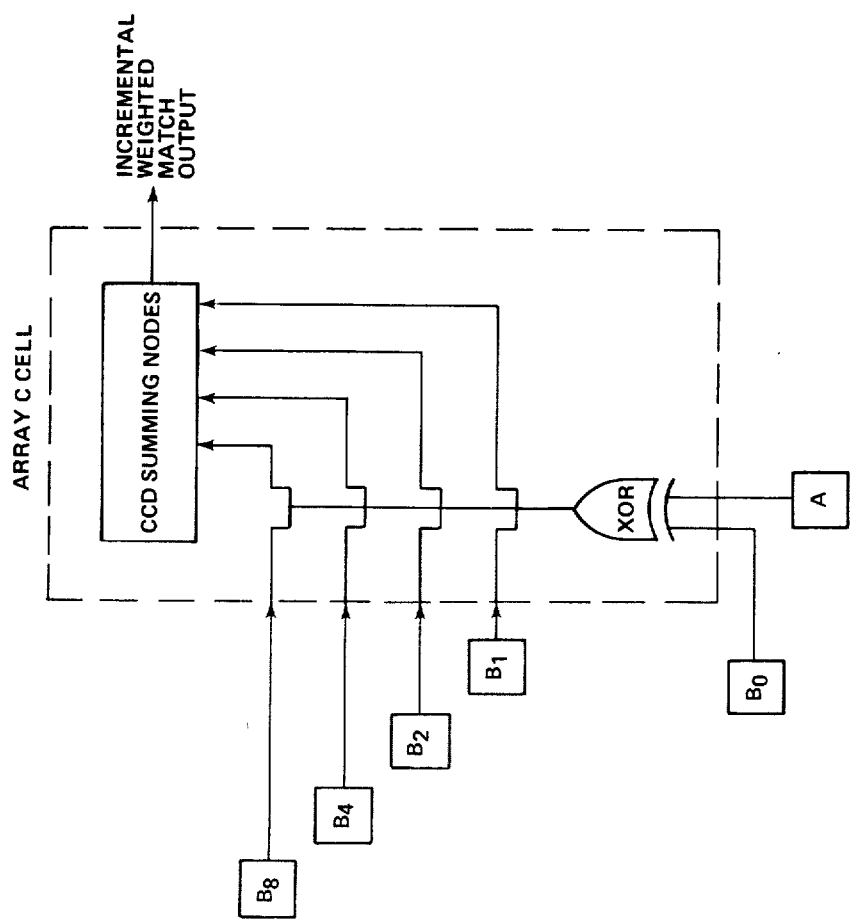
FIG. 4 is a single array stage containing coupled cells from each register.

The basic correlation function is performed by the structure detailed in FIG. 4. The two inputs A and $B_0$ are processed by the XOR structure to provide the voltage level for the multiple MOS transistor gates shown. The output of the XOR gates the charge from nodes $B_1$, $B_2$, $B_4$, and $B_8$ into the summing nodes. The truth table for the function performed is as follows:

| Input condition | A | $B_0$ | Magnitude of charge increment added into the summing nodes |
|---|---|---|---|
| Match | 0 | 0 | $B_8, B_4, B_2, B_1$ |
| Mismatch | 0 | 1 | 0 |
| Mismatch | 1 | 0 | 0 |
| Match | 1 | 1 | $B_8, B_4, B_2, B_1$ |

The incremental charge sums from a multiplicity of Exclusive-Or XOR gates are each added to provide the total weighted match (global) output. Signal levels are all digital prior to the processing in the array cell. Within the array cell and into the global array output, the signal levels are analog.

The register interactive functions are shown further in FIG. 4. The data bit from array register A within each stage together with the sign 0 bit from array register B serves as the input to the Exclusive OR gate contained within the array register C cell within each stage. The output from the Exclusive OR gate within the array C state enables the transfer of weighted charge into the CCD summing nodes as shown in FIG. 4. The output from each array C cell provides an incremental charge component which is summed throughout the entire array of C stages for a global weighted output.

Figure 5:
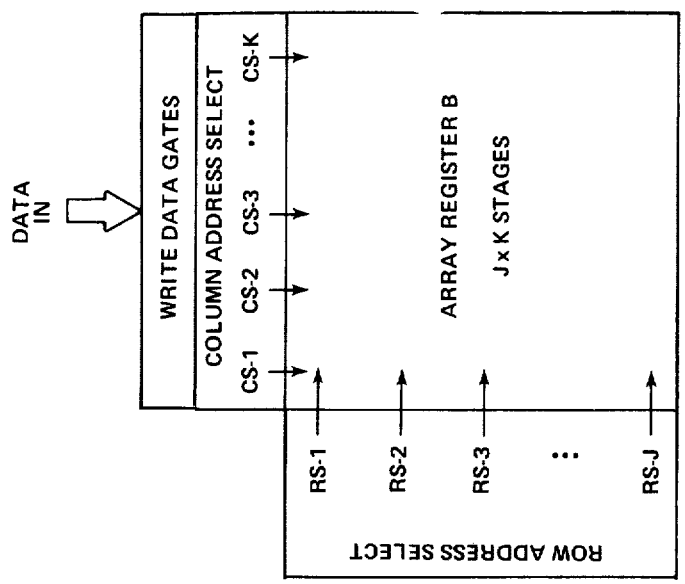
FIG. 5 illustrates register B with serial word-address and random word-address control functions.

The digital registers A and B each are controlled through a circuit located outside of the matrix of $J \times K$ stages. This detail is shown for array register B in the example of FIG. 5. Each column of array register B has address select lines labeled CS at each column and row select lines RS at each row. Data is written into array register B along columns. The column select bus CS serves a dual purpose of addressing and data transfer. The address controller is contained in circuitry external to the JK separate stages of array register B.

A separate controller is used to serially load and shift data along rows of array register A.

A simple extension embodiment would be to interchange row and columns for address and shifting. Another extension would be to utilize both random addressing, serial addressing or both in combinations with array registers A and B separately or together.

Figure 6:
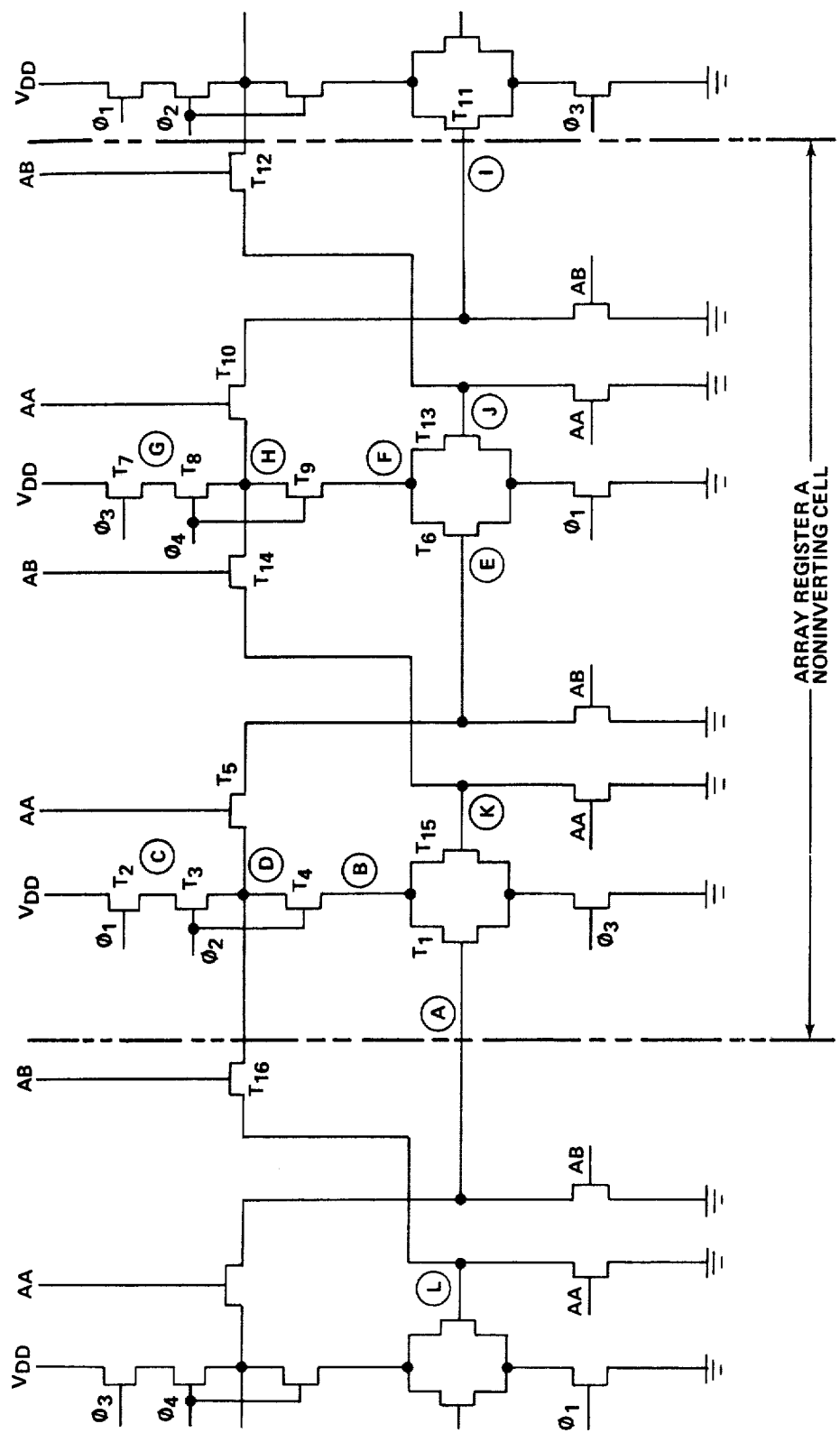
FIG. 6 is a circuit diagram of array register A cell with bidirectional shift and static hold functions (MOS embodiment)

In FIG. 6, the circuit schematic of array register A cell with bidirectional shifting and static holding functions is shown. The array register A cell consists of a non-inverting shift register stage clocked with a four phase power supply. The control lines appearing along rows of the array are labeled AA and AB. These two control lines entering each stage along the row determine the direction of data shifting for the serial address array. In FIG. 6 a MOS technology circuit implementation is shown. The control timing for a shift-right function in array A for FIG. 6 is shown in accompanying FIG. 7. The control pulses are shown as AA and AB. The four clocking phases are shown as 1, 2, 3, and 4. Voltages at nodes A,B,C,D,E,F, and I correspond to similarly designated nodes on FIG. 6.

Figure 7:
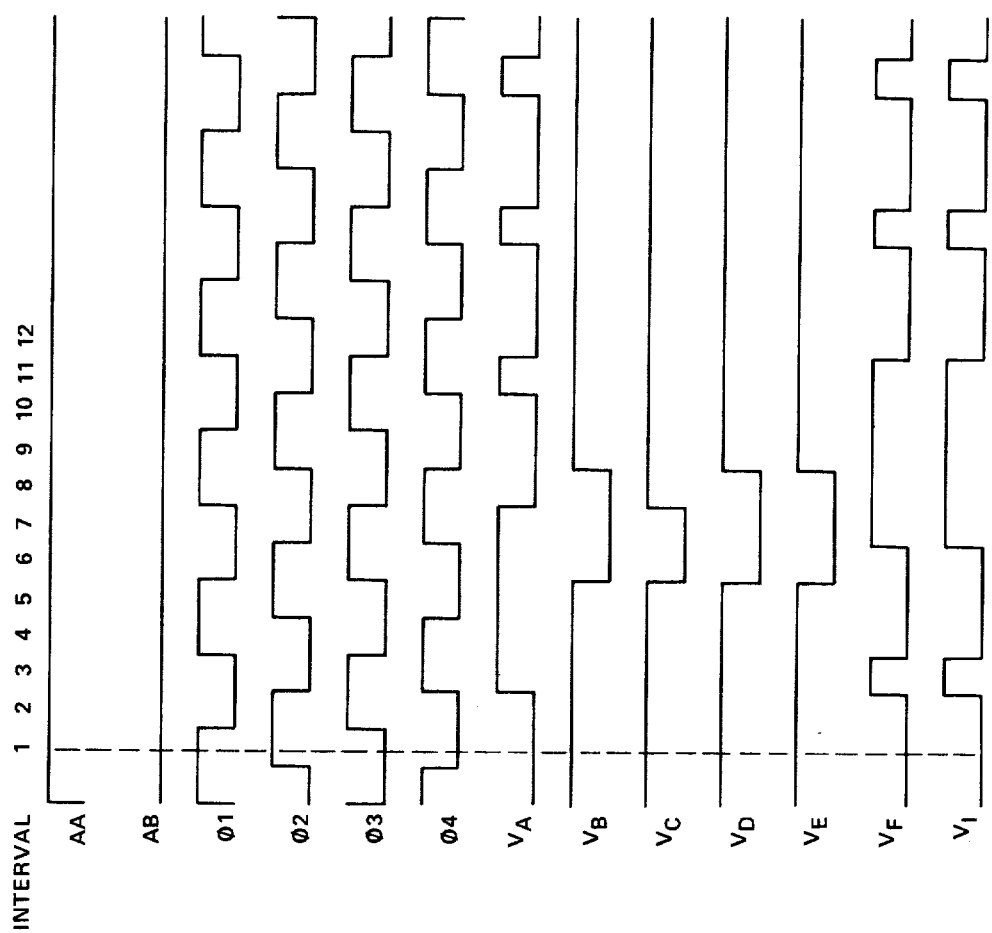
FIG. 7 illustrates the control pulses for shift-right function in array register A.

In a typical clocking situation data entering the shift register A stage appears at node A during time interval 1 as shown in FIG. 7. Also during time interval 1 nodes B, C, and D are precharged to a positive voltage level. During time interval 2 the signal level at node B is sampled and not discharged in this case. During time interval 3 the data input to the shift register from the left at node A is seen to rise to a positive value. The shift upward in signal during interval 3 results as new data is shifted into the register A stage from the adjacent row. During time interval 4 the data at node A remains in the high voltage state indicating a valid logical 1 signal now having entered the stage. During time interval 5 the nodes B, C, and D are again precharged to a positive value. During time interval 6, node B is complemented to a low voltage level corresponding to a logic inversion of the input signal at node A. During time interval 6 the shift in signal levels to a low voltage occurs at nodes C, D and E corresponding to the conduction of transistor T1 during this interval. During time interval 7 the voltage at node E is seen to be at a low level for the input of the second stage of shift register A non-inverting cell. During time interval 7 nodes F, G, and H are precharged to a high voltage level. During time interval 8 node F is not discharged and the high voltage remains at node F. The high voltage level at node F during interval 8 corresponds to the logical inversion of the data at node E through transistor T6. Transistor T6 does not conduct during interval 8 and therefore the voltage at node F remains in a high voltage state. Further during time interval 8 the voltage at node I corresponding to the output signal from the stage follows the voltage on node F. During time interval 8 the signal on node I becomes valid data corresponding to the non-inverted but delayed signal having entered earlier into node A for validation during time interval 4. The non-inverted data remains valid at node I during intervals 9 and 10. During interval 11 the voltage goes high at node I corresponding to the precharging of that node through transistors T7 and T8 as phase 3 and phase 4 signals goes high. During time interval 12 the output voltage from the stages goes low corresponding to the signal at node A having gone low during time interval 8. Shift register A non-inverting cells each delay the data by 4 time intervals.

Figure 8:
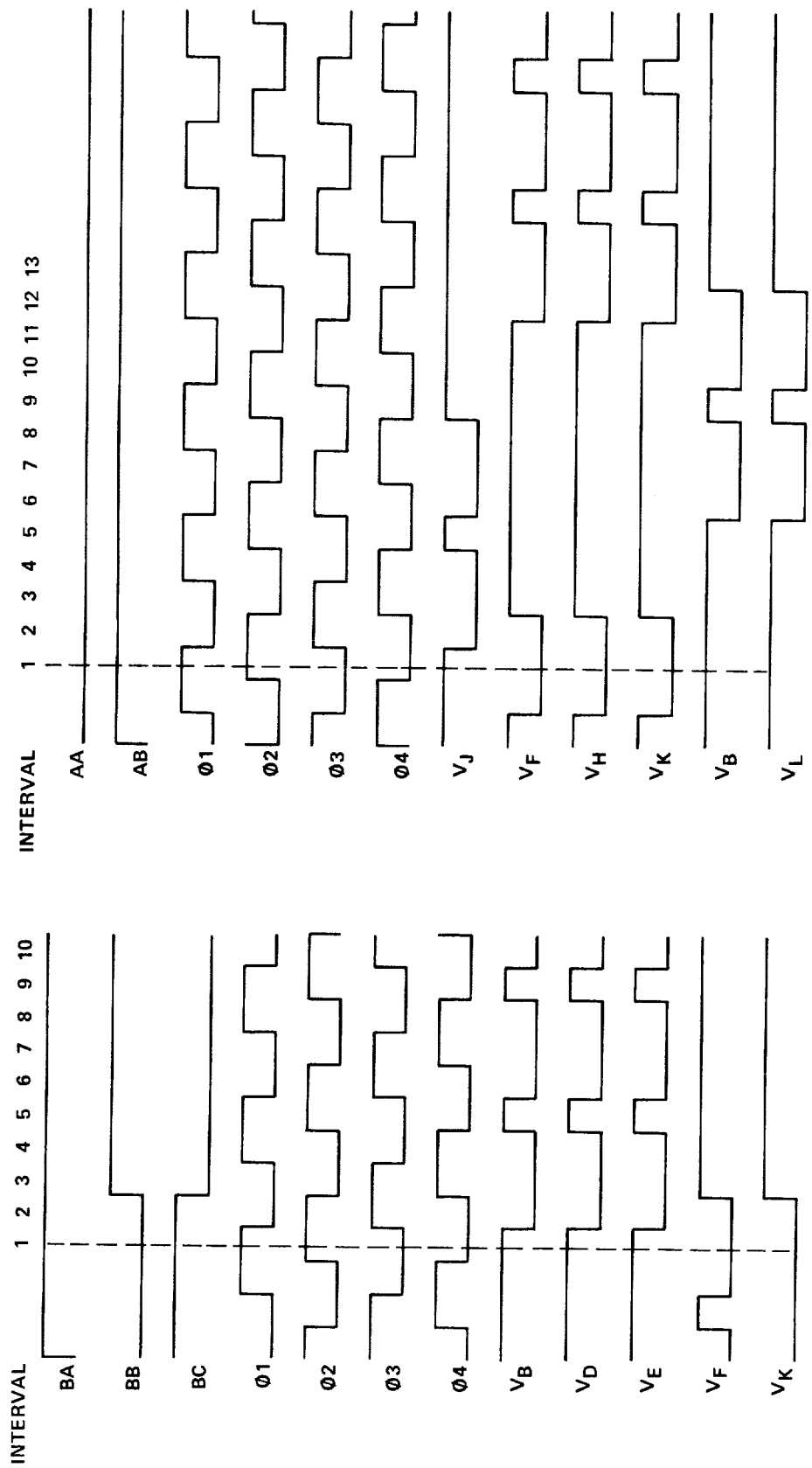
FIG. 8 illustrates the control pulses for shift-left function in array register A.

The timing of pulses for shift left in array register A is shown in FIG. 8 for the circuit of FIG. 6. In FIG. 8 the control pulses AA and AB are set low and high, respectively, for shift-left of data through register A stages along columns in the array. Data arriving into the non-inverting cell is valid initially at interval 2. During interval 2, node J receives a low voltage value or logical zero from the adjacent transistor T11 inverter. During time interval 1 node J has been precharged to a high voltage level in preparation for the test during time interval 2. During time interval 3, nodes F, G and H are precharged to a high voltage level. During time interval 4, node F is tested through transistor T13 and this node is not discharged. During time interval 4, the signal level at node F remains high corresponding to the logical inversion of data at node J. During time interval 5, nodes B, C, and D are charged to a high level in preparation for a test of node B during time interval 6. During time interval 6, node B is discharged through transistor T5 to ground and results in the logical inversion of the signal at node K compared with the data level at node F during previous intervals. Further, during time intervals 6, 7 and 8, the signal level at node B is gated to node L which remains in a low voltage condition, providing the output from this stage of register A. The low voltage output levels from this stage during this time interval 6, 7 and 8 correspond to the delayed (non-inverted) values input to this same stage during intervals 2, 3 and 4. Further, a logical zero value input to this stage during time intervals 6, 7 and 8 at node J is delayed by four time intervals for valid data at node L during time intervals 10, 11 and 12. During interval 13, the output from the stage at node L shifts to its logical high value again to complete the non-inverting operation of data with a delay of 4 time intervals.

The above discussion reviews the operation of the circuit in FIG. 6 for logical shift right and logical shift left functions. This shifting function describes the manner in which data is serially loaded and shifted through array register A stages.

Figure 9:
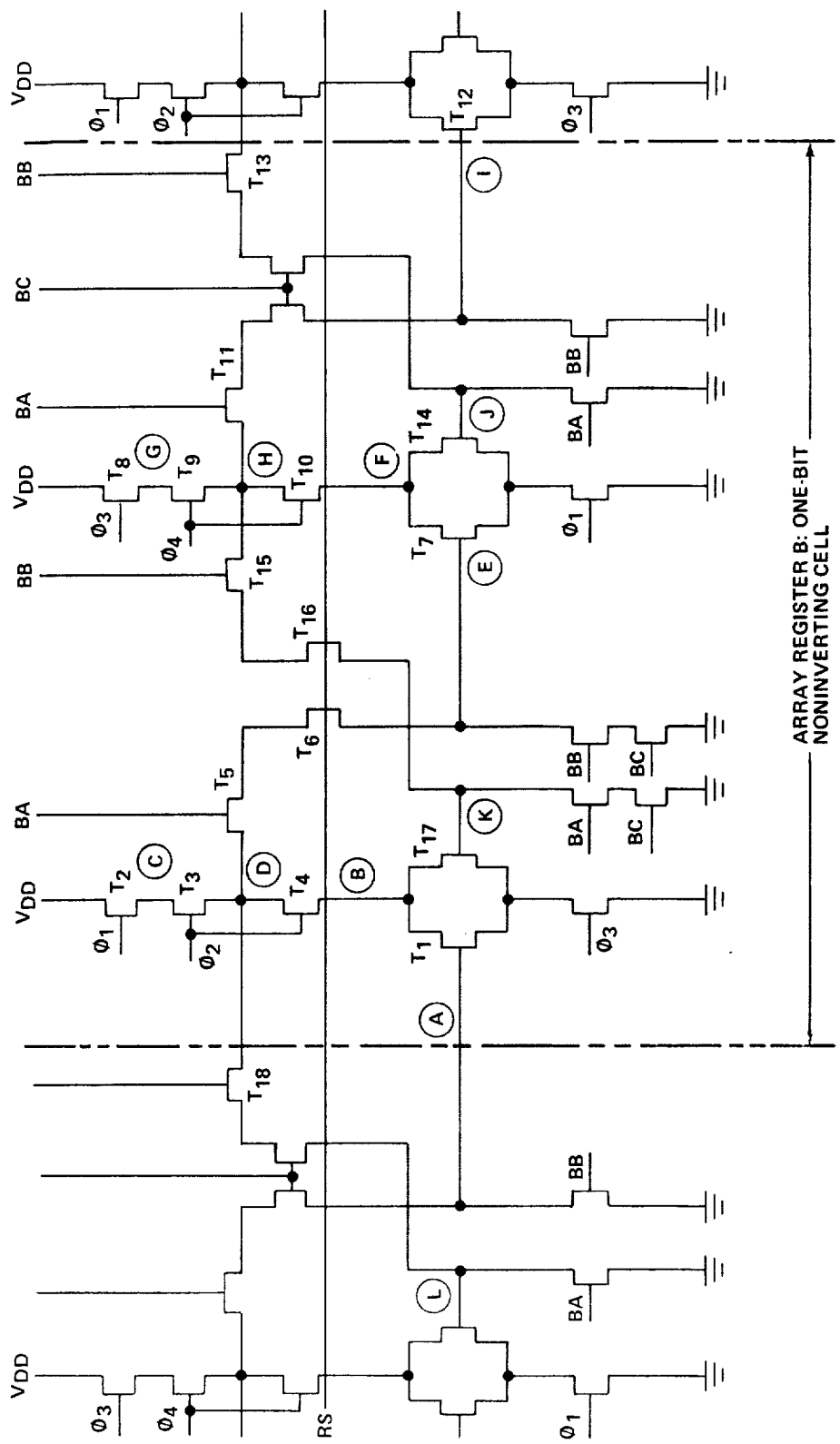
FIG. 9 is a circuit diagram of array register B bit-cell with bidirectional shift, random address, and static holding functions (MOS embodiment).

The circuit schematic of array register B bit cell structure with bidirectional shifts, random address, and static holding functions is shown in FIG. 9. The technology implementation shown here is MOS with a four phase power supply. Each stage of array register B is addressed via three separate column control lines, BA, BB and BC, and a row select line RS.

The control pulse sequence for static holding function implementation in array register B is shown in FIG. 10 for the circuit of FIG. 9. During time interval 1 in FIG. 10, the voltage at nodes B, C, D, and E are all precharged to the high voltage or logical one state. Similarly the voltage at node F is found to be the logical inversion of that level at node E as a result of the conduction through transistor T7. During time interval 2, the typical shift right sequence corresponding to the operation that would have derived from FIG. 6 continues and the signal level at node B, D and E is discharged through transistor T1 to ground and assumes zero level. During time interval 3, the input control lines are complemented to provide the static holding function of data in the designated stage of array register B. During time interval 3, the voltage control on lines BB and BC is inverted and during this interval the voltage at node F and K is seen to precharge up to the high level. The control line BC signal level, low during interval 3 and succeeding intervals, permits the voltage at nodes E and K to rise as necessary to provide the static hold function. During time interval 4, the high level at node K provides the necessary logical high level causing conduction in transistor in T17 and the discharge of node B during the following interval 6. The precharge of node B during interval 5 and the successive inversion during interval 6 provides the desired static latching of data within this non-inverting cell of the stage. During time interval 6 and successive intervals through interval 10, there is no change in the data latched at the output nodes I and L for this stage.

The FIG. 10 control pulse sequence illustrates the transition from normal shift right sequencing during intervals 1 and 2 with the following static holding function which is implemented during pulse 3 through 10.

The circuit of FIG. 9 may also be controlled for random address writing of a logical 1 or a logical zero into the array register B bit cells and static holding thereof.

Figure 11:
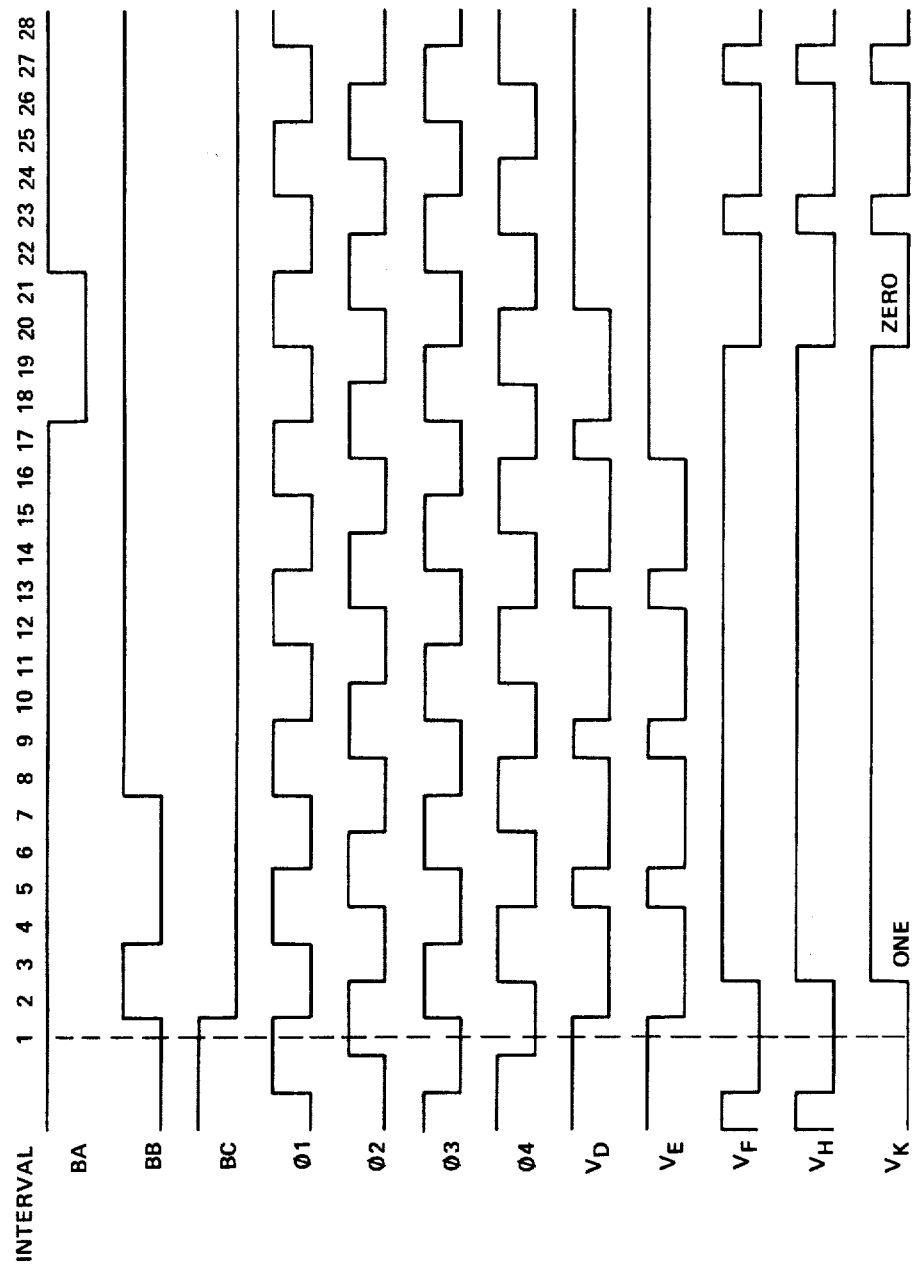
FIG. 11 illustrates the control pulses for random address writing with static retention of data in an array register B bit-cell.

FIG. 11 illustrates the control pulse sequence for random addressing of ones and zeros into the stage of FIG. 9.

The writing of a logical 1 into this stage begins as nodes B, C and D are precharged to the high voltage stage during the interval 1. Time interval 1 can also be the conclusion of a right shift sequence in which lines BA and BC have been in the high state. During time interval 2 the line control BC is brought to a low signal level isolating the non-inverting cell from its next nearest neighbors. Control line BB is brought high together with line BA which discharges nodes A and J to a low signal level. During time interval 3, node K is set to a logical high level as it is charged through the transistor chain T8, T9, T15, and T16. Similarly during time interval 3, nodes F and H are brought to a logical high level as they are precharged at this same time also. During time interval 4, control line BB is brought low and node F remains in the high state because transistor T7 remains cut off (the voltage level at node E remains low). During time interval 4 the writing of a logical one into the stage of array register B is complete. During time interval 5 nodes B, C, D and E are precharged to a high level. Following pulse interval 6 the voltage at node F remains high indicating that a static holding latch function has been enabled. The logical high which has been written into this stage under random addressing conditions remains until the voltage through the control lines changes at time interval 18. Array register B cells require row select RS line to be high and conduction through transistor T6 and T16 for proper addressing. Thus the random addressing of data into the array register B cell occurs with row select RS going high and the data line BA also going high.

A logical zero can be randomly written into this cell by again row select RS going high and the inversion of the control lines BA and BB as occurs in time interval 18 of FIG. 11. Specifically, when new data is written into the cell nodes A and J must be set equal to zero. In preparation for time interval 18, nodes A and J are set equal to zero during time interval 15. Node E is set at a high signal level during time interval 17 as it is precharged to the high signal level through transistor T2, T3, T5 and T6 during time interval 17. During time interval 18 control line BA is brought low initiating a shift-left sequence within the cell. During time interval 19 the node F is precharged to a logical high value. During time interval 20 the voltage at node F is discharged through ground to T7 as the voltage level at node E remains high. During time interval 20 and 21 the shifting action into node D is completed and a logical zero has been entered into the one bit non-inverting cell. During time intervals 20 through interval 28 the voltage signal at node D remains high and the signal level at node K remains low indicating that a logical zero has been written into the cell with static latching action. Following time interval 28 with the control signal on lines BA, BB and BC, the logical zero at node K will remain unchanged.

The array register C consists of a digital input gating function Exclusive OR gate with its output deriving a sequential analog shift register stage.

Figure 12:
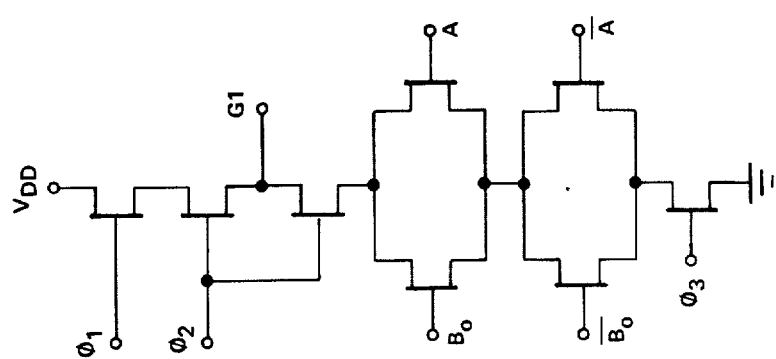
FIG. 12 is a circuit diagram of an MOS embodiment of the digital correlation gate.

FIG. 12 shows the Exclusive OR gate implemented in MOS circuitry with a four phase clocking power supply to match that used for the array registers A and B. This minimum device count circuit uses 8 transistors to provide the desired match function. The input to this Exclusive OR gate is derived from the bit stage of array register A and the match bit of array register B as shown in FIG. 12. The output digital level from the Exclusive OR gate is used to set the voltage on gate G1 of the analog charge couple device register in this same stage.

Figure 13:
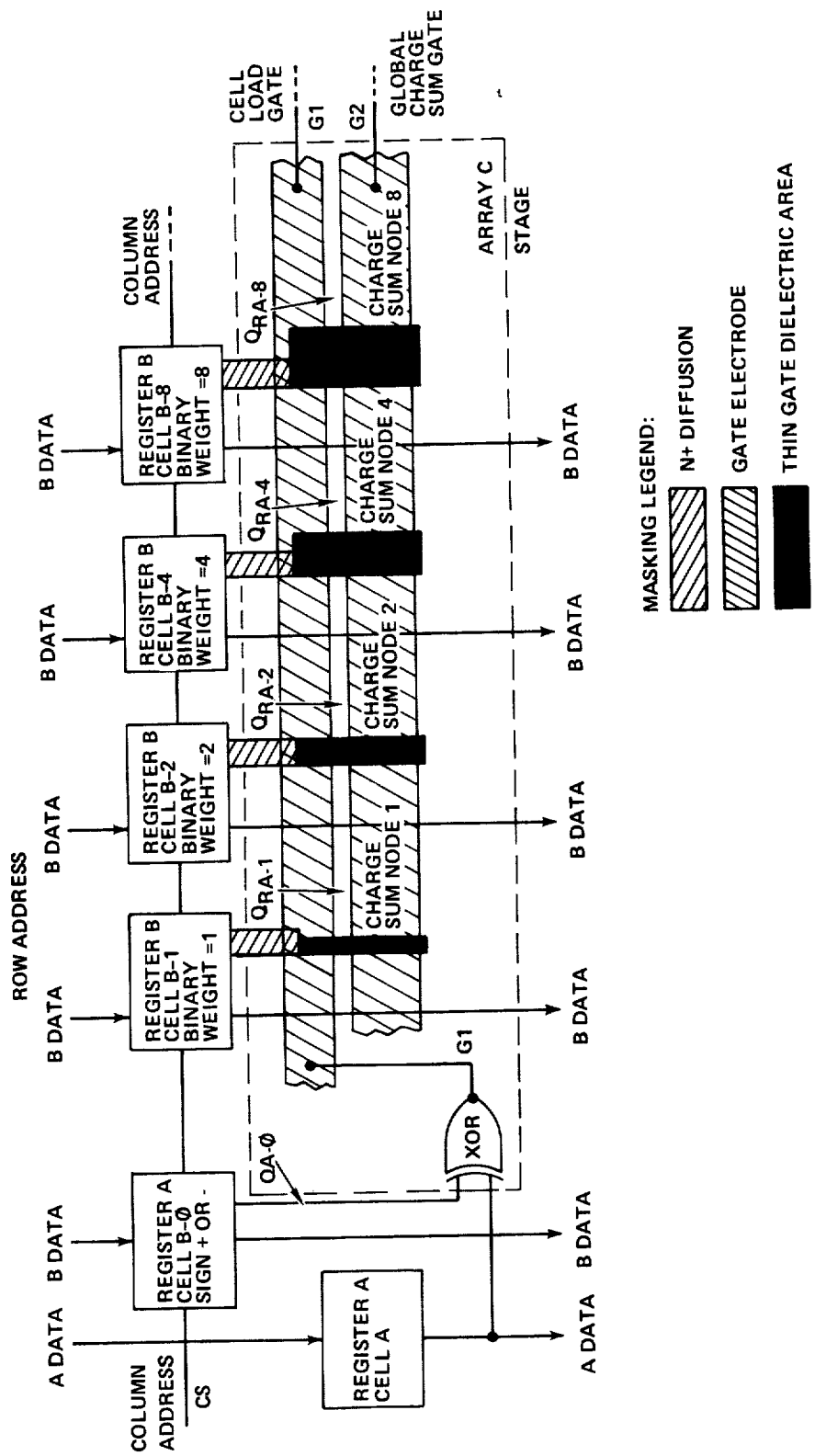
FIG. 13 illustrates one stage of array C with inputs from registers A and B.

A further detailed view of array register C is shown in FIG. 13 with the output from the Exclusive OR(XOR) gate connected to the cell load gate G1. The cell load gate G1 permits the charge injection of carriers from the weighted cells of shift register B into a charge summing node at gate G2. The cell load gate G1 is wholly contained within the cell and does not extend to adjacent C stages. The gate G2 extends globally throughout the array and is used to control the dumping of the output electron charge into the physical substrate of the subject integrated circuit. The thin oxide dielectric underneath gate G2 within each array C stage consists of four separate thin oxide areas as shown in FIG. 13. The thin oxide areas underneath gate G2 are in area ratio of 8, 4, 2, 1 in direct proportion to the desired signal weighting function for binary cells at B8, B4, B2 and B1 respectively. The charge summed underneath gate G2 as a result of a logical high signal from the shift register B-8 cell corresponds to the maximum charge sum $Q_{RA-8}$ that can be stored at a charge sum node within a given stage C. Correspondingly, the area of the thin oxide underneath gate G2 and charged by shift register B-1 cell permits storage of the minimum charge level $Q_{RA-1}$. The storage capabilities of the CCD summing nodes is directly proportional to the storage capacitance of these same nodes.

Figure 14:
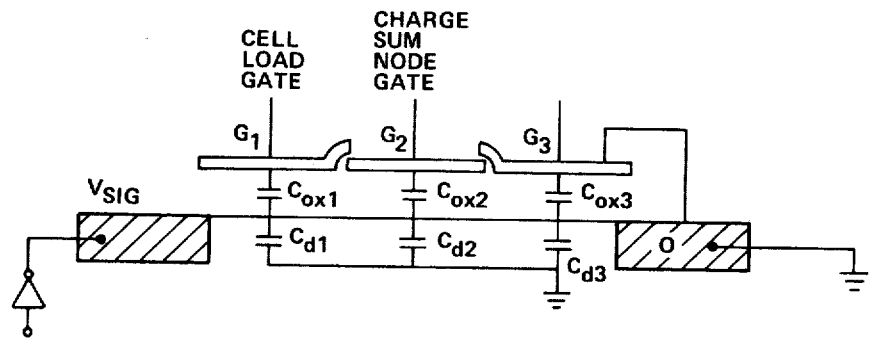
FIG. 14 illustrates gate structures in an array C cell.

FIG. 14 shows the cross-section of gate structure for the analog charge coupled nodes in each separate array C stage. The level $V_{SIG}$ is set either to a high or low voltage level by the correspondingly stage of register B (reference FIG. 12). There are four separate weight data lines $V_{SIG}$ into each array register B stage. The cell load gate G1 is controlled at either zero or high signal levels by the output of the Exclusive OR gate. Charge is injected from the source diffusion (region 1 of FIG. 15) into the charge sum node capacitance COX2 underneath gate G2. When charge is being injected into the charge storage node underneath gate G2 the voltage level on gate G2 is held at a high voltage level. The gate G3 constitutes a barrier for further charge transfer into the substrate and this gate is normally held at ground potential. The loading and charge storage action of the charge coupled nodes of FIG. 14 is further shown in FIG. 15. During the gate in time interval the signal level from the source diffusion results in a charge injection into the potential well underneath gates G1 and G2. During the initial gate time interval the voltage at gate 1 is set at either high or low (in this case at a low voltage level for illustration purposes). During the store charge sum time interval the voltage at gate G1 is brought to a low voltage level, and this in turn isolates the charge summed underneath gate G2 as QSUM. During the next time interval output to substrate, the voltage signal levels of gate G1 and gate G2 are brought to a zero potential value resulting in a collapsing of the field charge depletion region underneath gate G2, and a subsequent injection of charge $Q_{SUM}$ into the substrate. It is this injection of charge into the substrate which is monitored by external circuitry and used to determine the actual magnitude of the overall correlation function for the entire 2-dimensional array of stages.

Typically gate G1 is controlled by clocking phases $\phi1$ and $\phi2$, and gate G2 is controlled by clocking phases $\phi3$ and $\phi4$.

Figure 15:
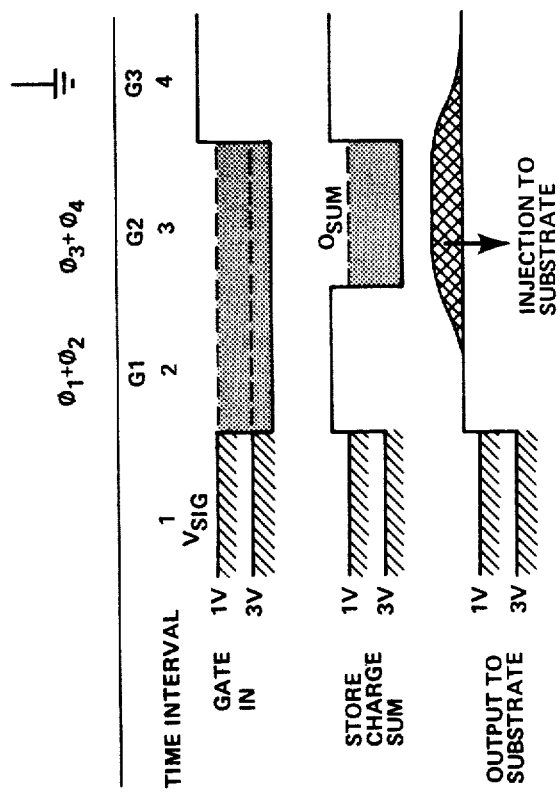
FIG. 15 illustrates the analog data shift sequence in array C cell with output to substrate node.

During the output to substrate time interval in FIG. 15, the total amount of charge $Q_{SUM}$ flowing between the gate G2 and the substrate is monitored external to the array circuit. The temporal integration of this charge injection into the substrate is the overall correlation output function.

Having described the invention and a specific embodiment thereof, it is understood that other and further modifications may suggest themselves to those skilled in the art and it is intended to cover such modifications as fall within the scope of the appended claims.

What is claimed is:

1. A system for processing first and second digital signals to provide a weighted output, comprising; a first two-dimensional matrix register with serial addressed data input, said data input being said first digital signal, a second two-dimensional matrix register capable of serial or random address data input, said data input being said second digital signal, and a third register for receiving said first and second digital signals and providing said weighted output when said first and second digital signals match.

2. The system according to claim 1 wherein the first and second registers have a plurality of stages and each stage of the first register has a single bit cell and each stage of the second register has a plurality of bit cells.

3. The system according to claim 2 wherein each cell in said first register has bidirectional shift and static hold functions.

4. The system according to claim 2 wherein each cell in said second register includes means for being randomly addressed and means for statically retaining data.

5. The system according to claim 2 where at least two or more the plurality of bit cells include a weighting factor.

6. The system according to claim 1 wherein the output from each stage of the third register provides an incremental charge component which is summed throughout the entire third register for a single analog output.

7. The system according to claim 6 wherein the third register is an array of charged coupled devices formed on a common substrate with a summing node within each stage, and the charge at each stage is injected into the substrate to provide the system output.

8. A system for processing digital signals and producing a weighted output therefrom comprising; first means for shifting a serial digital signal therethrough, a second means for storing a multibit digital signal and third means for receiving the serial digital signal and the multibit digital signal and forming a product of the two signals and outputing the product in analog form.

9. The system according to claim 8 wherein some bits of the multibit digital signal are weighted.

10. The system according to claim 8 wherein the second means for storing multibit digital signals is randomly adressable.

11. The system according to claim 8 wherein said first and second means are in the form of two dimensional matrices having J rows and K columns and the two matrices are cross-coupled.

12. The system according to claim 8 wherein the input to said second means may be either sequential words or randomly addressed words.

* * * * *